United States Patent
Xu et al.

(10) Patent No.: US 11,206,613 B2
(45) Date of Patent: Dec. 21, 2021

(54) METHOD FOR PERFORMING LIGHT CONNECTION CONTROL ON USER EQUIPMENT AND CORRESPONDING EQUIPMENT

(71) Applicant: Samsung Electronics Co., Ltd, Suwon-si (KR)

(72) Inventors: Lixiang Xu, Beijing (CN); Hong Wang, Beijing (CN); Xiaowan Ke, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 170 days.

(21) Appl. No.: 16/324,885

(22) PCT Filed: Aug. 11, 2017

(86) PCT No.: PCT/KR2017/008797
§ 371 (c)(1),
(2) Date: Feb. 11, 2019

(87) PCT Pub. No.: WO2018/030861
PCT Pub. Date: Feb. 15, 2018

(65) Prior Publication Data
US 2020/0314758 A1    Oct. 1, 2020

(30) Foreign Application Priority Data

Aug. 11, 2016 (CN) .......................... 201610659800.3
Jun. 16, 2017 (CN) .......................... 201710459639.X

(51) Int. Cl.
H04W 52/02    (2009.01)
H04W 4/70     (2018.01)
(Continued)

(52) U.S. Cl.
CPC ......... *H04W 52/0261* (2013.01); *H04W 4/70* (2018.02); *H04W 8/08* (2013.01); *H04W 76/27* (2018.02)

(58) Field of Classification Search
CPC ... H04W 52/0261; H04W 4/70; H04W 76/27; H04W 8/08; H04W 68/005;
(Continued)

(56) References Cited

U.S. PATENT DOCUMENTS

2016/0057797 A1    2/2016  Bangolae et al.
2017/0013515 A1*   1/2017  Bangolae .............. H04W 76/38
(Continued)

FOREIGN PATENT DOCUMENTS

EP    2757856 A1        7/2014
EP    2991411 A1        3/2016
WO    2015/200263 A1   12/2015

OTHER PUBLICATIONS

English translation CN108307490A; retrieved from the Internet via Google Translate tool on Dec. 17, 2020 (Year: 2020).*
(Continued)

*Primary Examiner* — Benjamin H Elliott, IV

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services.

16 Claims, 7 Drawing Sheets

(51) Int. Cl.
  *H04W 76/27*  (2018.01)
  *H04W 8/08*  (2009.01)
(58) Field of Classification Search
  CPC ............. H04W 52/0229; H04W 76/10; H04W 52/0216; H04W 68/02; H04W 52/0209
  See application file for complete search history.

(56) References Cited

U.S. PATENT DOCUMENTS

| | | | | |
|---|---|---|---|---|
| 2017/0311278 | A1* | 10/2017 | Adjakple | ............ H04W 68/005 |
| 2017/0311290 | A1* | 10/2017 | Adjakple | ................ H04W 4/06 |
| 2018/0092155 | A1* | 3/2018 | Hong | ..................... H04W 48/20 |
| 2019/0021064 | A1* | 1/2019 | Ryu | ........................ H04W 76/27 |
| 2019/0132900 | A1* | 5/2019 | Hong | ....................... H04W 8/08 |
| 2019/0174480 | A1* | 6/2019 | Wong | .................. H04W 72/042 |
| 2019/0174571 | A1* | 6/2019 | Deenoo | ................. H04W 76/11 |
| 2019/0230625 | A1* | 7/2019 | Kim | ....................... H04W 76/27 |
| 2020/0084613 | A1* | 3/2020 | Ying | ...................... H04W 36/02 |
| 2020/0260384 | A1* | 8/2020 | Ryu | .................. H04W 52/0248 |
| 2020/0314758 | A1* | 10/2020 | Xu | ........................ H04W 76/27 |

OTHER PUBLICATIONS

3GPP TSG-RAN WG2 Meeting #94 R2-163441 Nanjing, China, May 23-27, 2016; "Discussion of RRC States in NR"; Nokia et al. (Year: 2016).*
3GPP TSG-RAN WG2 Meeting #94 R2-163450 Nanjing, China, May 23-27, 2016; "Design principles and considerations for the LTE light connection"; Samsung (Year: 2016).*
3GPP TSG RAN WG2 Meeting #94 R2-163631 Nanjing, China, May 23-27, 2016; "Benefits of Light connection over Suspend-Resume procedure"; Intel (Year: 2016).*
3GPP TSG RAN WG2 Meeting #94 R2-163884 Nanjing, China, May 11-15, 2016; "General principle for signalling reduction of paging lightly connected UE"; Potevio (Year: 2016).*
3GPP TSG-RAN WG2 #94 R2-164047 Nanjing, China, May 23-27, 2016; "Details of paging enhancements and Light Connection"; Kyocera (Year: 2016).*
3GPP TSG-RAN WG3 Meeting #92 R3-161352 Nanjing, China, May 23-27, 2016; "Paging for light connection"; Nokia et al. (Year: 2016).*
International Search Report dated Nov. 29, 2017 in connection with International Patent Application No. PCT/KR2017/008797, 3 pages.
Written Opinion of the International Searching Authority dated Nov. 29, 2017 in connection with International Patent Application No. PCT/KR2017/008797, 7 pages.
Huawei et al., "New WI proposal: Signaling reduction to enable light connection for LTE", 3GPP TSG RAN Meeting #71, Mar. 7-10, 2016, 7 pages, RP-160540.
Huawei, HiSilicon, "Evaluation on RAN initiated paging and MME initiated paging", 3GPP TSG-RAN WG2 Meeting #94, May 23-27, 2016, 12 pages, R2-163930.
Intel Corporation, "Discussion on Core Network Assistance Information", 3GPP TSG RAN WG2 Meeting #85, Feb. 10-14, 2014, R2-140494, 5 pages.
Communication pursuant to Article 94(3) EPC dated Nov. 13, 2019 in connection with European Patent Application No. 17 839 878.0, 8 pages.
Intel Corporation, "Light connection DRX paging cycle and mechanism", 3GPP TSG RAN WG2 Meeting #94, May 23-27, 2016, 5 pages, R2-163632.
InterDigital Communications, "Control Plane and Connectivity Principles for NR", 3GPP TSG-RAN WG2 #94, May 23-27, 2016, 5 pages, R2-164160.
Huawei, HiSilicon, "UE mobility tracking in "active state" and in "power saving" state", 3GPP TSG-RAN2 Meeting #94, May 23-27, 2016, 6 pages, R2-164129.
Supplementary European Search Report dated Jan. 18, 2019 in connection with European Patent Application No. 17 83 9878, 14 pages.
Qualcomm Incorporated, "TS 23.501: System aspects of RRC_INACTIVE (closing editor notes from baseline)", SA WG2 Meeting #121, May 15-19, 2017, S2-173124, 6 pages.
Qualcomm Incorporated, "TS 23.501: System aspects of RRC_INACTIVE (closing editor notes)", SA WG2 Meeting #S2-122, Jun. 26-30, 2017, S2-174470, 5 pages.
Huawei et al., "Revision of WI: Signalling reduction to enable light connection for LTE", 3GPP TSG RAN Meeting #72, Jun. 13-17, 2016, RP-160937, 7 pages.
Communication pursuant to Article 94(3) EPC dated Mar. 30, 2021 in connection with European Patent Application No. 17 839 878.0, 9 pages.
Office Action dated Mar. 26, 2021 in connection with Korean Patent Application No. 10-2019-7004014, 8 pages.
China National Intellectual Property Administration, Translation of "First Search", dated Jun. 30, 2021, in connection with a counterpart Chinese Patent Application No. 201710459639.X, 1 page.
Nokia et al., "Paging for light connection", 3GPP TSG-RAN WG2 Meeting #94, R2-163888, Nanjing, China, May 23-27, 2016, 6 pages.

* cited by examiner

PRIOR ART

[Fig. 3]
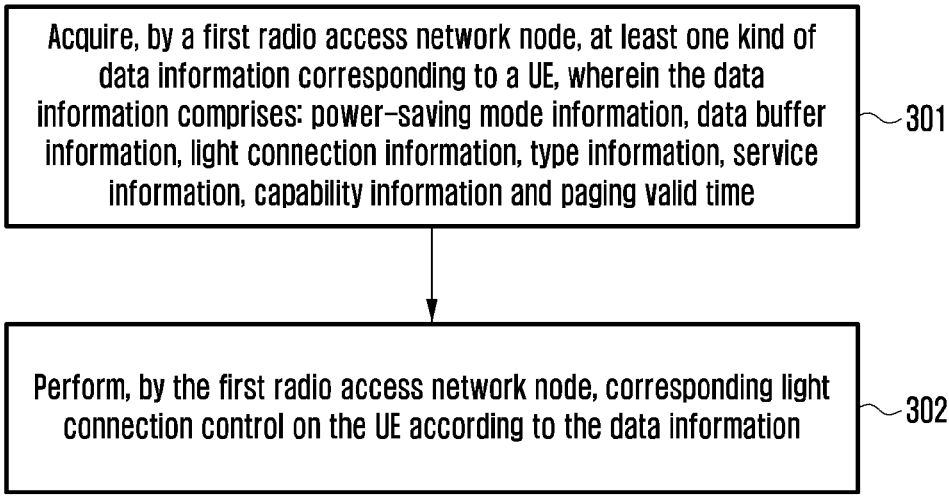
[Fig. 4]
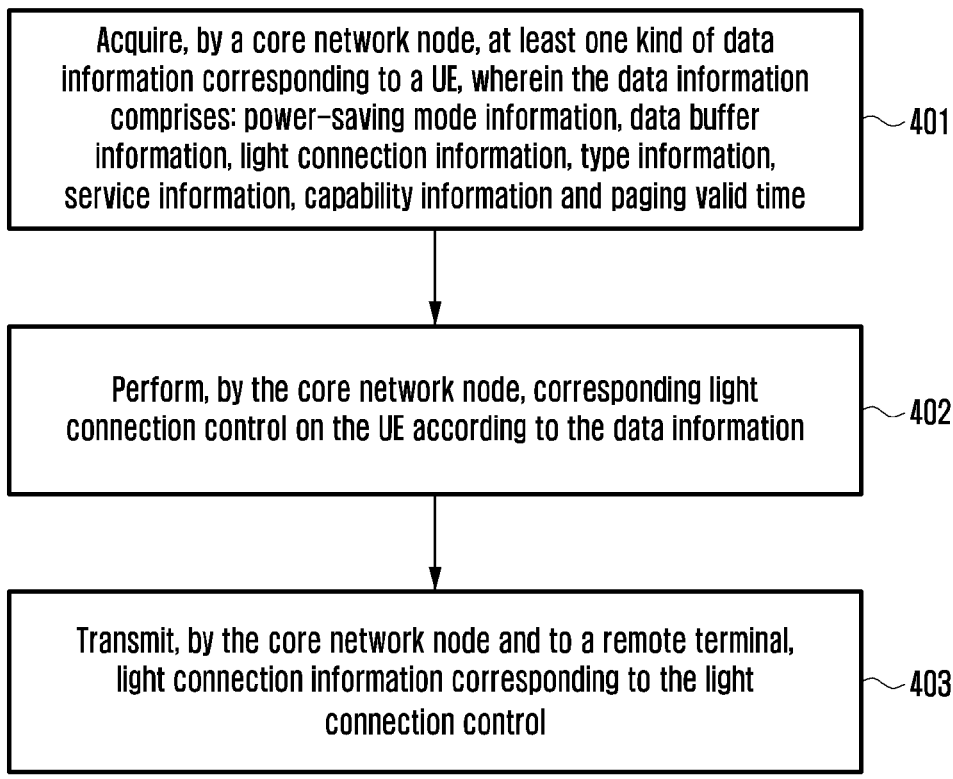

[Fig. 5]
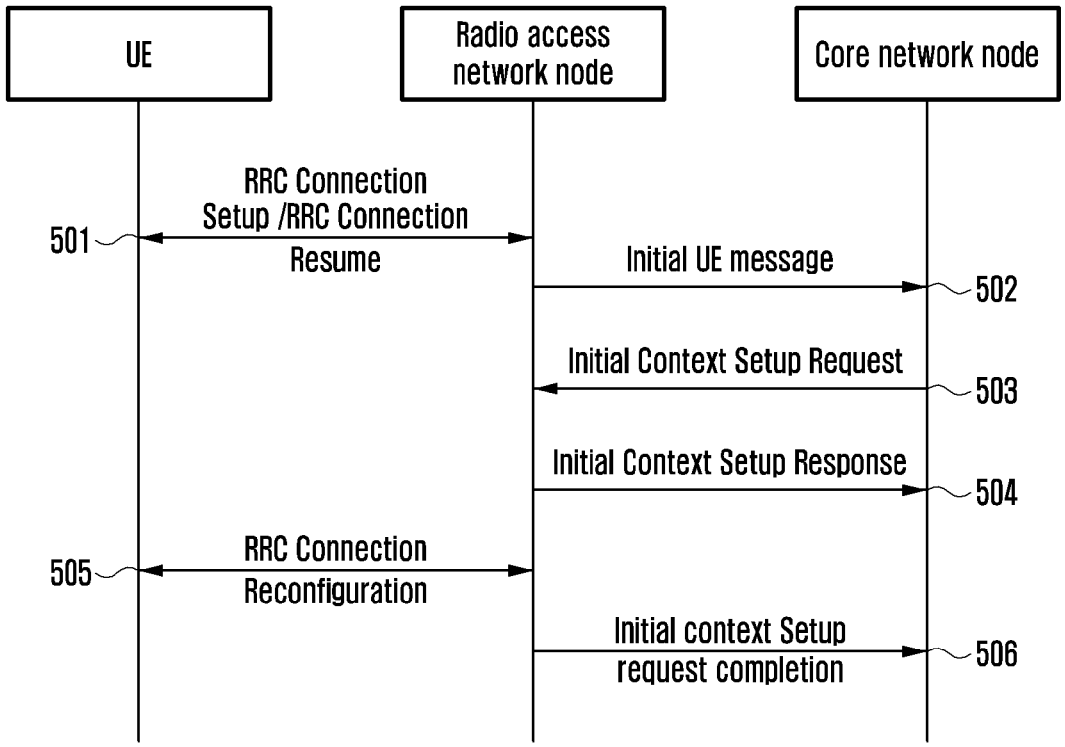
[Fig. 6]
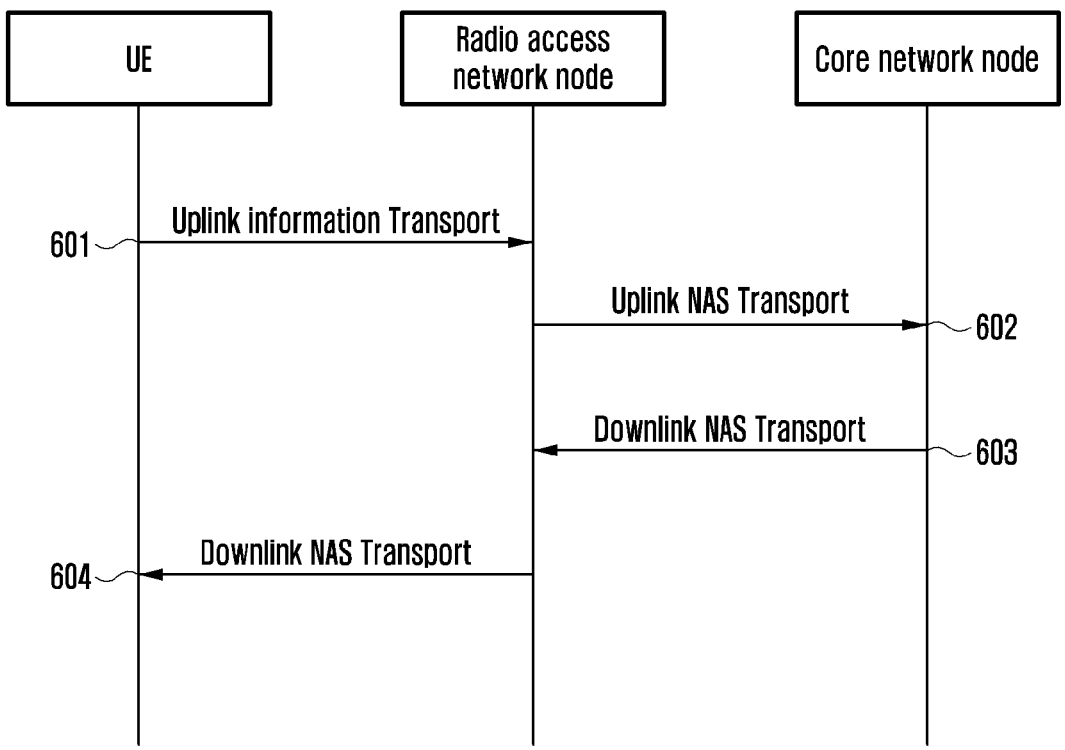

[Fig. 7]
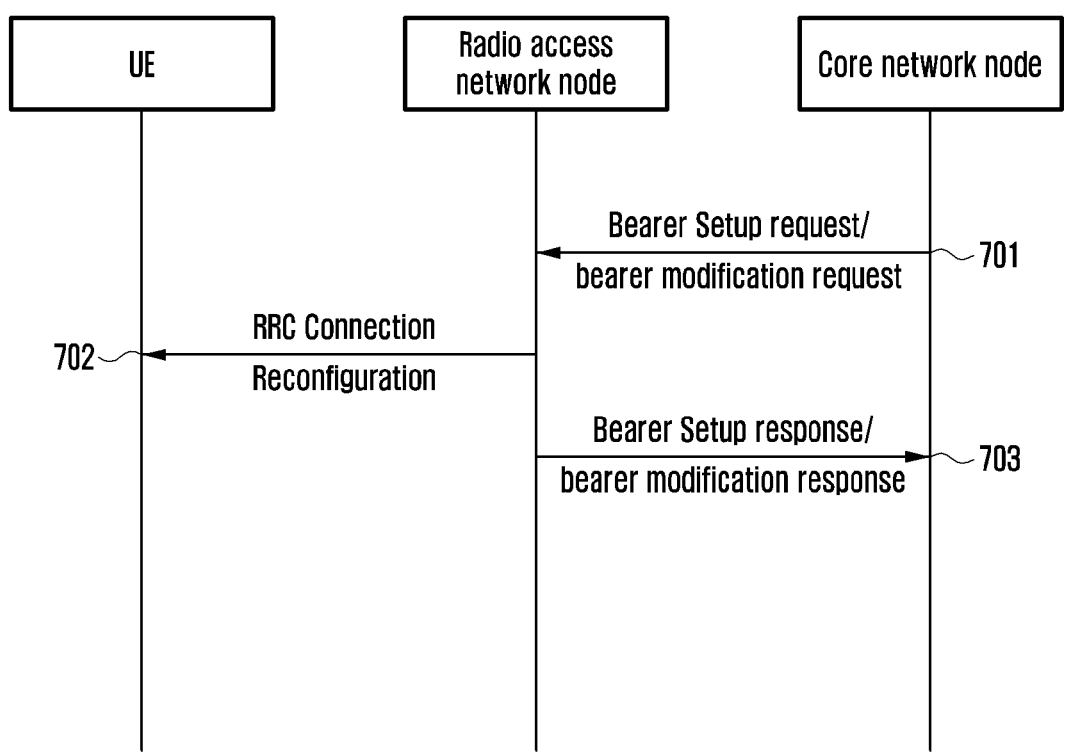

[Fig. 8]
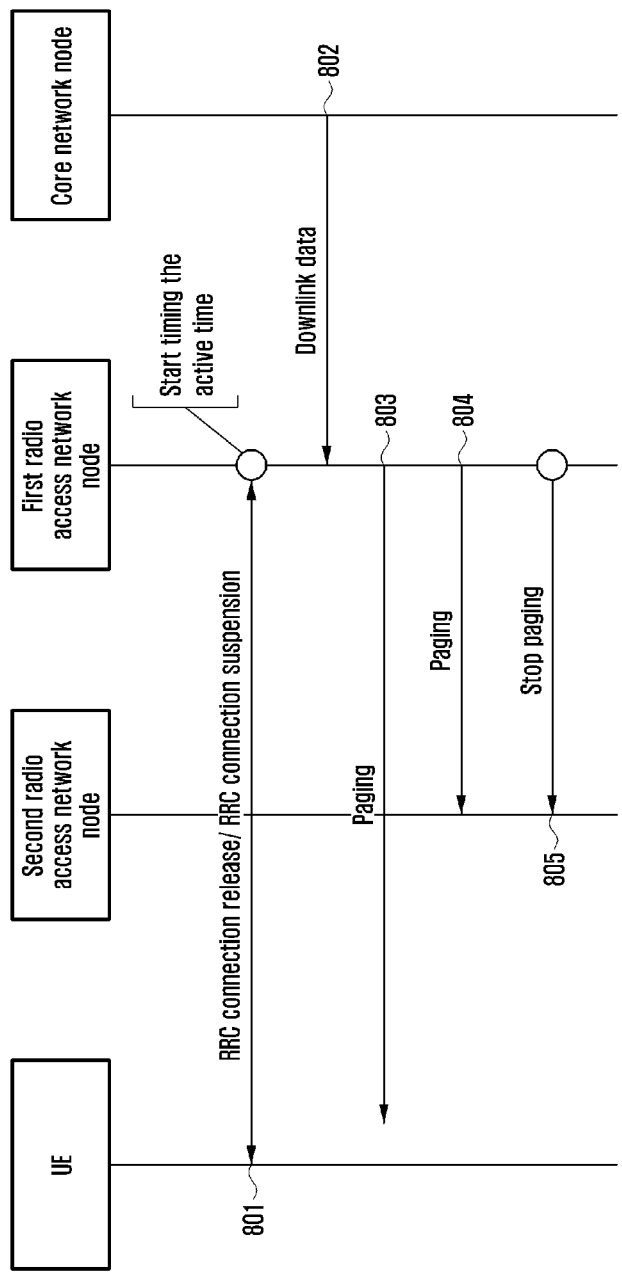
[Fig. 9]
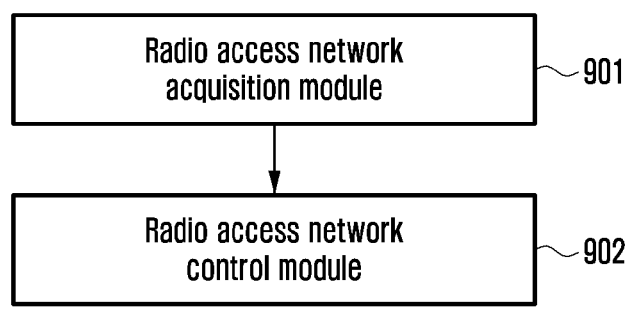

[Fig. 10]
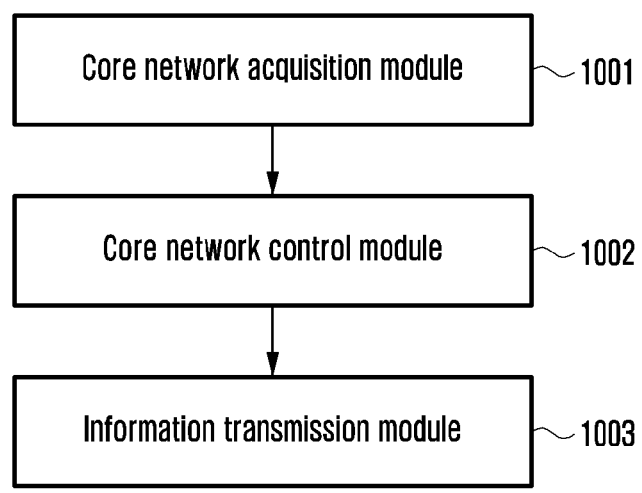

METHOD FOR PERFORMING LIGHT CONNECTION CONTROL ON USER EQUIPMENT AND CORRESPONDING EQUIPMENT

CROSS-REFERENCE TO RELATED APPLICATIONS

This application is a 371 of International Application No. PCT/KR2017/008797 filed on Aug. 11, 2017, which claims priority to Chinese Patent Application No. 201610659800.3 filed on Aug. 11, 2016 and Chinese Patent Application No. 201710459639.X filed on Jun. 16, 2017, the disclosures of which are herein incorporated by reference in their entirety.

BACKGROUND

1. Field

The present application relates to the technical field of radio communication, and in particular to a method for performing light connection control on a user equipment (UE) and a corresponding equipment.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beam-forming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

The modern mobile communications increasingly provide multi-media service of high-rate transmission to users.

FIG. 1 is a system architecture diagram of system architecture evolution (SAE), in which: User Equipment (UE) 101 is a terminal device supporting a network protocol; Evolved-universal Terrestrial Ratio Access Network (E-UTRAN) 102 is a radio access network, including a Base Station (eNodeB/NodeB) which provides an interface for a UE for accessing to a radio network; Mobility Management Entity (MME) 103 is responsible for managing a mobility context, session context and security information of a UE; Serving Gateway (SGW) 104 mainly plays a role of providing a user plane, and the MME 103 and the SGW 104 may in a same physical entity; Packet Data Gateway (PGW) 105 is responsible for charging, legal interception or the like, and may be in the same physical entity as the SGW 104; Policy and Charging Rule Functional Entity (PCRF) 106 provides a Quality of Service (QoS) policy and charging rule; serving GPRS support node (SGSN) 108 is a network node device which provides routing for transmission of data in a Universal Mobile Telecommunication System (UMTS); Home Subscriber Server (HSS) 109 is a home ownership subsystem of a UE, and responsible for protecting user information such as current location of a UE, address of a serving node, user security information, packet data context of a UE.

FIG. 2 is a schematic diagram of initial system architecture of the next generation of network (5G). Wherein, the initial system architecture comprises a NextGen UE, a Next Gen access network or Next Gen radio access network (Next Gen (R)AN), a NextGen Core and a data network. A control plane interface between the Next Gen (R)AN and the NextGen Core is NG2 (which is also called as NG-C), and a user plane interface is NG3 (which is also called as NG-U). These interfaces are named temporarily, and the use of other names eventually decided by the 3GPP will not influence the main contents of the present invention. The NextGen Core further comprises a user plane functional entity and a control plane functional entity.

In the foreseeable future, there will be more and more intelligent electrical equipment, Internet-based home accessories, which all have access to the network function. On the one hand, the future part of the UE often has the following characteristics: static or low mobility, low-cost, data transmitted or received is often in a small amount of data, and non-continuous. For these UEs, the signaling overhead caused by establishing and releasing a connection is far greater than the amount of data transmitted or received. On the other hand, in order to support more and more real-time applications, such as virtual reality, the access delay of the future mobile communication network is greatly reduced. In order to save the signaling overhead, improve the efficiency of data transmission, and reduce the delay of the UE access network, the existing network still have many problems to be solved.

SUMMARY

To overcome the technical problems or at least partially solve the technical problems, the following technical solutions are provided.

An embodiment of the present invention provides a method for performing light connection control on a user equipment (UE), comprising the steps of:

acquiring, by a first radio access network node, at least one type of data information corresponding to a UE; and performing, by the first radio access network node, corresponding light connection control on the UE according to the data information;

wherein the data information comprises: power-saving mode information, data buffer information, light connection information, type information, service information, capability information and paging valid time.

Preferably, the step of performing, by the first radio access network node, corresponding light connection control on the UE comprises at least one of the following:

performing, by the first radio access network node, corresponding paging control on the UE;

performing, by the first radio access network node, corresponding UE data buffer control; and performing, by the first radio access network node, corresponding configuration of light connection control on the UE.

Preferably the step of performing, by the first radio access network node, corresponding paging control on the UE comprises:

when the first radio access network node is disconnected from the UE, makes sure the UE is in light connection or the UE is in inactive, performing corresponding paging control on the UE according to the power-saving mode information of the UE.

Preferably, the step of performing corresponding paging control on the UE according to the power-saving mode information of the UE comprises at least one of the following:

when the power-saving mode information indicates that the UE has entered a power-saving mode or has requested for the power-saving mode, not paging the UE; and when the power-saving mode information indicates that the UE is within the corresponding power-saving mode active time, paging the UE.

Preferably, the step of performing, by the first radio access network node, corresponding UE data buffer control comprises:

when the first radio access network node is disconnected from the UE, makes sure the UE is in light connection or the UE is in inactive, performing corresponding UE data buffer control according to the data buffer information and/or power-saving mode information of the UE.

Preferably, the step of performing corresponding paging control on the UE according to the paging valid time of the UE, comprises:

when the first radio access network node is disconnected from the UE, makes sure the UE is in light connection or the UE is in inactive, the first radio access network node receives data for the UE, performs radio access network paging on the UE according to the received paging valid time of the data.

Preferably, the step of performing corresponding UE data buffer control on the UE according to the data buffer information and/or power-saving mode information of the UE comprises:

when the UE satisfies preconfigured unreached conditions, performing data buffer on the UE.

Preferably, the preconfigured unreached conditions comprise at least one of the following:

the first radio access network node fails to receive a response to the paging after initiating a paging to the UE;

the power-saving mode information indicates that the UE has entered a power-saving mode or has requested for the power-saving mode; and the power-saving mode information indicates that the UE is out of the corresponding power-saving mode active time.

Preferably, the step of performing, by the first radio access network node, corresponding configuration of light connection control on the UE comprises at least one of the following:

when the power-saving mode information of the UE indicates that the UE has entered a power-saving mode or has requested for the power-saving mode, not configuring, by the first radio access network node, light connection for the UE;

when the light connection information of the UE indicates that the UE has requested for light connection or has satisfied the conditions for the light connection, configuring, by the first radio access network node, the light connection for the UE;

when the type information and/or capability information of the UE indicates that the type of the UE belongs to a preconfigured light connection type, configuring, by the first radio access network node, light connection for the UE; and when the service information of the UE indicates that the UE has executed a preconfigured light connection service type, configuring, by the first radio access network node, light connection for the UE.

Another embodiment of the present invention provides a method for performing light connection control on a user equipment (UE), comprising the steps of:

acquiring, by a core network node, at least one type of data information corresponding to a UE;

performing, by the core network node, corresponding light connection control on the UE according to the data information; and transmitting, by the core network node and to a remote terminal, light connection information corresponding to the light connection control;

wherein the data information comprises: power-saving mode information, data buffer information, light connection information, type information, service information, capability information and paging valid time.

Preferably, the method further comprises the steps of:

performing, by the core network node, corresponding power-saving mode control on the UE according to the data information; and transmitting, by the core network node and to the remote terminal, power-saving mode information corresponding to the power-saving mode control.

Preferably, the step of performing, by the core network node, corresponding light connection control on the UE comprises at least one of the following:

when the light connection information indicates that the UE has requested for light connection or has satisfied the conditions for the light connection, performing, by the core network node, light connection on the UE;

when the type information and/or capability information indicates that the type of the UE belongs to a preconfigured light connection type, performing, by the core network node, light connection on the UE; and when the service information indicates that the UE has executed a preconfigured light connection service type, performing, by the core network node, light connection on the UE.

Preferably, the step of performing, by the core network node, corresponding power-saving mode control on the UE comprises:

when the core network node does not perform light connection control on the UE, performing power-saving mode control on the UE.

Preferably, the step of performing, by the core network node, corresponding power-saving mode control on the UE comprises:

when the core network node performs light connection control on the UE, not performing power-saving mode control on the UE.

Preferably, the remote terminal comprises a UE and/or a first radio access network node.

Still another embodiment of the present invention provides an equipment for performing light connection control on a user equipment (UE), comprising:

a radio access network acquisition module configured to acquire, by a first radio access network node, at least one type of data information corresponding to a UE; and a radio access network control module configured to perform, by the first radio access network node, corresponding light connection control on the UE according to the data information;

wherein the data information comprises: power-saving mode information, data buffer information, light connection information, type information, service information, capability information and paging valid time.

Yet another embodiment of the present invention provides an equipment for performing light connection control on a user equipment (UE), comprising:

a core network acquisition module configured to acquire, by a core network node, at least one type of data information corresponding to a UE;

a core network control module configured to perform, by the core network node, corresponding light connection control on the UE according to the data information; and an information transmission module configured to transmit, by the core network node and to a remote terminal, light connection information corresponding to the light connection control;

wherein the data information comprises: power-saving mode information, data buffer information, light connection information, type information, service information, capability information and paging valid time.

Compared with the prior art, the present invention has the following advantages.

In an embodiment of the present invention, in view of the problem that it is likely to result in signaling overhead far greater than the amount of data to be received/transmitted when UEs are connected to or disconnected from the network, as well as high delay while accessing to the network, which is easily caused by the trend of a large number of UEs to be accessed to the network and a small amount of data to be received/transmitted in the future, a method for performing light connection control on a UE is provided. At least one of power-saving mode information, data buffer information, light connection information, type information, service information, capability information and paging valid time of the UE is acquired by a first radio access network node, and corresponding light connection control is performed on the UE according to the acquired information. In other words, with the solutions, the first radio access network node can distinguishingly perform light connection control on the UE according to the acquired different information corresponding to the UE, so that the signaling overhead is saved, the time delay for the UE to access to the network is reduced, and the advantages of the light connection function are realized.

In an embodiment of the present invention, in view of the problem that it is likely to result in signaling overhead far greater than the amount of data to be received/transmitted when UEs are connected to or disconnected from the network, as well as high delay while accessing to the network, which is easily caused by the trend of a large number of UEs to be accessed to the network and a small amount of data to be received/transmitted in the future, a method for performing light connection control on a UE is provided. At least one of power-saving mode information, data buffer information, light connection information, type information, service information, capability information and paging valid time of the UE is acquired by a core network node; and, the core network node performs corresponding light connection control on the UE according to the acquired information, and transmits, to a remote terminal, light connection information corresponding to the light connection control. In other words, with the solutions, the core network node can distinguishingly perform light connection control on the UE according to the acquired different information corresponding to the UE, so that the signaling overhead is saved, the time delay for the UE to access to the network is reduced, and the advantages of the light connection function are realized.

Additional aspects and advantages of the present invention will be partially appreciated and become apparent from the description below, or will be well learned from the practices of the present invention.

BRIEF DESCRIPTION OF THE DRAWINGS

The above and/or additional aspects and advantageous of the present invention will become apparent and be more readily appreciated from the following descriptions of embodiments, with reference to the accompanying drawings, in which:

FIG. 3 is a flowchart of a method for performing light connection control on a user equipment (UE) according to an embodiment of the present invention;

FIG. 4 is a flowchart of a method for performing light connection control on a UE according to an embodiment of the present invention;

FIG. 5 is a schematic diagram of the method for performing light connection control on a UE according to Embodiment 1 of the present invention;

FIG. 6 is a schematic diagram of the method for performing light connection control on a UE according to Embodiment 2 of the present invention;

FIG. 7 is a schematic diagram of the method for performing light connection control on a UE according to Embodiment 3 of the present invention;

FIG. 8 is a schematic diagram of the method for performing light connection control on a UE according to Embodiment 4 of the present invention;

FIG. 9 is a schematic structure diagram of an equipment for performing light connection control on a UE according to an embodiment of the present invention; and FIG. 10 is a schematic structure diagram of an equipment for performing light connection control on a UE according to an embodiment of the present invention.

DETAILED DESCRIPTION

Figure 1:
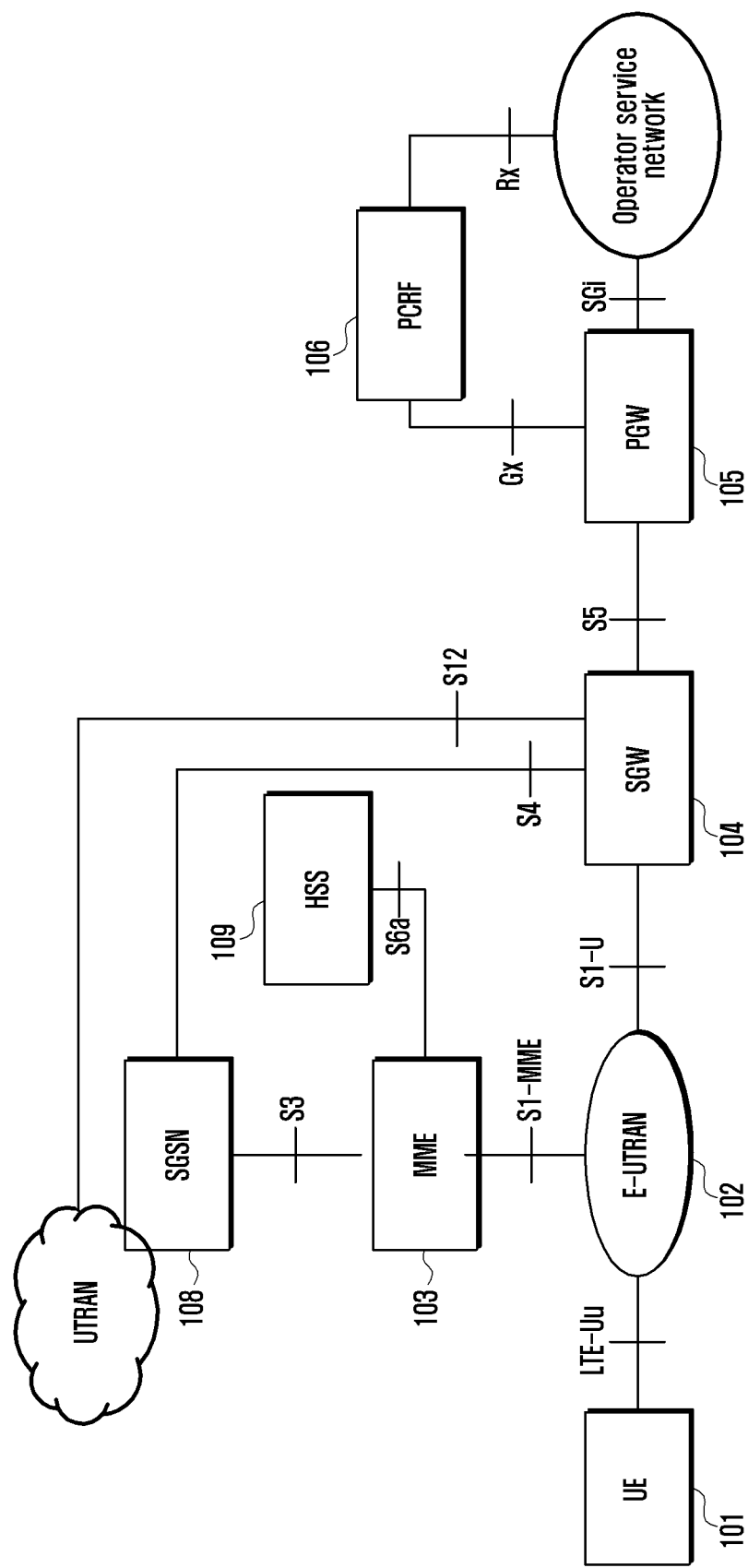
FIG. 1 is a system architecture diagram of a System Architecture Evolution (SAE) in the prior art.

Embodiments of the present invention will be described in detail hereinafter. The examples of these embodiments have been illustrated in the accompanying drawings throughout which same or similar reference numerals refer to same or similar elements or elements having same or similar functions. The embodiments described with reference to the accompanying drawings are illustrative, merely used for explaining the present invention and should not be regarded as any limitations thereto.

It should be understood by one person of ordinary skill in the art that, unless otherwise defined, all terms (including technical and scientific terms) used herein have the same meaning as commonly understood by one person of ordinary skill in the art to which the present invention belongs. It shall be further understood that terms, such as those defined in commonly used dictionaries, should be interpreted as having a meaning that is consistent with their meanings in the context of the prior art and will not be interpreted in an idealized or overly formal sense unless expressly so defined herein.

To conveniently understand the technical solutions of the present invention, it is necessary to instructively describe the principle and corresponding terms of the present invention.

Figure 2:
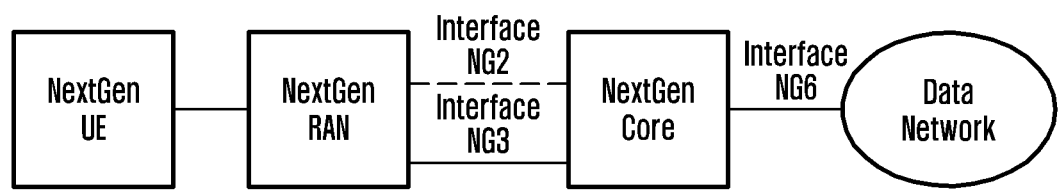
FIG. 2 is a schematic diagram of initial system architecture of the next generation of network (5G) in the prior art.

In order to decrease signaling of paging area scope and decrease signaling of service setup, the present invention provides a UE connection mode of light connection. Specifically, the light connection means that when the radio access network releases the connection of the UE or the UE is in inactive, the radio access network does not request the core network to release a connection for the UE, such as the connection for the UE between the base station and the MME (S1 interface control plane), the connection for the UE between (S1 interface user plane) the base station and the SGW, the connection (i.e. NG-C interface control plane) for the UE between the base station and Access and Mobility Management Function (AMF), and the connection (i.e. NG-U interface user plane) for the UE between the base station and User Plane Function (UPF). When the UE is in the idle state or the UE is inactive, the radio access network still maintains the UE context, and the core network (such as MME, SGW, AMF, SMF and UPF) regards the UE is still in the normal connected state. When there is downlink data, the core network (such as SGW and UPF) transmits data for the UE to the base station. If at this time, the UE is already in the idle state or inactive (such as the connection between the UE and the base station has been disconnected, suspended or inactive), the base station can initiate a paging for the UE. The light connection can be applied to two system architectures, i.e., SAE and 5G, as shown in FIGS. 1 and 2.

After the UE connection mode of light connection is proposed, a series of problems to be solved during data transmission will be caused. Those problems will be analyzed below one by one.

Problem 1: A UE can request a core network for a power-saving mode, and a core network node can allocate a power-saving mode active time for the UE after the confirmation. When the UE is disconnected from the network or inactive, the UE can continuously monitor the network within the power-saving mode active time configured by the core network node. When the configured power-saving mode active time expires, the UE enters the power-saving mode. For a UE entering the power-saving mode, the UE will not monitor the network, including not monitoring the paging initiated by the radio access network node to the UE. The radio access network currently does not know whether the UE has requested for the power-saving mode. When the UE is disconnected from the radio access network or the UE is in inactive, and if the radio access network configures the UE to be in the light connection state, that is, if the connection for the UE between the radio access network and the core network is maintained, the radio access network node cannot acquire, when paging a UE, a response from the UE entering the power-saving mode, thereby the paging resources are wasted.

Problem 2: Some data transmitted to the UE can tolerate a long transmission delay, for example, updated software releases. When the UE is unreached temporarily, the core network can buffer data for a period of time; and, the core network can transmit the buffered data to the UE when the connection of the UE to the network is resumed (for example, the UE resumes the connection to the network to transmit the periodic location update). For a UE in the light connection mode, the core network regards that the UE is still in the normal connected state, and directly transmits data to the radio access network rather than buffering the data. When the radio access network fails to receive a response to the paging to the UE, the radio access network will directly delete the data, without waiting for the resume of the connection of the UE to the network.

Problem 3: The paging initiated by the radio access network can be transmitted to other radio access network nodes for paging, and the other radio access network nodes do not have the paging accessible time for the UE. The UE resources will be wasted when paging the UE within the UE unreached time.

Problem 4: The light connection or being in inactive requires that the UE has performed relocating on a radio access network node after moving out of the accessible range of the current radio access network node. This requires the UE to monitor the network during movement. However, a UE entering the power-saving mode does not monitor the network. This is contradictory.

Problem 5: when the UE enters into light connection or being inactive, upon reception of data of the UE, the radio access network needs to trigger paging for the UE. However, different UEs have different paging valid time. If the UE doesn't response the paging, the radio access network will keep on paging, however, the data may have already become invalid, which causing the waste of paging resources.

Some terms as used herein are described as below.

In some implementations, the radio access network node can be a base station, an eNB, a NodeB, a radio access network central control unit, a radio access network node distribution unit or more. In the next generation of network, the concept of node may be virtualized as a function or a unit. The radio access network central control unit can be connected to a multiple of radio access network node distribution units.

In some implementations, the core network node can be an MME, an SGSN, an SGW, a CCNF, an AMF, an SMF or more, a core network control node (e.g., MME, CCNF and AMF), a core network user plane node (SMF, SGW and UDF), a core network control plane function, a core network user plane function, a core network control plane unit, a core network user plane unit or more. In the next generation of network, the concept of node may be virtualized as a function or a unit.

In some implementations, the core network control node can be an MME, an SGSN, a core network control plane function, a core network control plane unit or more.

In some implementations, the core network user plane node can be an SGW, an SGSN, a core network user plane function, a core network user plane unit, a network slice or more.

In some implementations, the power-saving mode active time for the UE can be manifested as a paging accessible time, a time when a paging can be initiated, a UE accessible time or more.

In some implementations, the light connection can also be manifested as the functionality of paging triggered by a radio access network.

In some implementations, whether a UE can perform light connection can be manifested as whether the UE is suitable for light connection, whether the UE is allowed to perform light connection, whether the UE can support light connection, whether the UE is able to perform light connection.

In some implementations, the light connection can be presented as the inactive state or the operation in inactive state.

In some implementations, the power-saving mode can be presented as Mobile Initiated Connection only (MICO) mode. The power-saving mode or MICO mode can refer that the UE may support Mobile Originated data but may not support Mobile Terminated data while the UE is in idle. For example, the UE can access the power-saving mode/MICO mode in idle state, the UE in the power-saving mode/MICO mode does not monitor the paging for this UE. The network may not page the UE upon generating or receiving the data for the UE (which belongs to the Mobile Terminated data). However, the network transmits the data to the UE until the UE accesses to the connected state or accessing to the network. The power-saving mode or MICO mode may not only be applied to the UE in idle state, but also may be applied to the UE in inactive state. In some implementations, the light connection or being inactive refers that the RRC connection between the UE and the radio access network is the light connection or inactive. In other implementations, the light connection or being inactive refers that the connection between the UE and the core network is the light connection or inactive.

It is to be noted that, the present invention provides a method for performing light connection control on a user equipment (UE). That is, the method is described from the perspective of a first radio access network node. By programming, the method for performing light connection control on a UE can be implemented as a computer program to be performed on a remote radio access network equipment. The remote radio access network equipment comprises but is not limited to: a computer, a network host, a single network server, a multiple of sets of network servers, or cloud consisting of a multiple of servers.

Specifically, FIG. 3 is a flowchart of a method for performing light connection control on a UE according to an embodiment of the present invention, specifically comprising the following steps.

Step 301: A first radio access network node acquires at least one type of data information corresponding to a UE, wherein the data information can comprise at least one of the following: power-saving mode information, data buffer information, light connection information, type information, service information, capability information and paging valid time.

Specifically, in some implementations, the first radio access network node can acquire the above information from a second radio access network node, the UE or a core network node.

Optionally, the power-saving mode information for the UE comprises at least one of the following: power-saving mode indication information for the UE, power-saving mode active time for the UE, enhanced Discontinuous Reception (DRX), and a paging transmission window.

The power-saving mode indication information for the UE can be an indication that the UE has requested for a power-saving mode or an indication that the core network node allows the UE to enter the power-saving mode.

The power-saving mode active time for the UE can be the time available for continuous monitoring the radio access network after the UE connection between the UE and radio access network is disconnected or inactive. When the time expires, the UE will not monitor the radio access network. The power-saving mode active time for the UE can be manifested as the paging time for the UE or the UE accessible time. The first radio access network node can page or configure the UE within this period of time. After the power-saving mode active time expires, the first radio access network node can stop paging.

Further, in some implementations, when the first radio access network node initiates a paging to the UE, the first radio access network node requests a third radio access network to page the UE. The paging request can contain the power-saving mode active time for the UE. Since there is a difference between the time when the paging is initiated and the time when the timing of the active time is actually started, the power-saving mode active time for the UE transmitted to the third radio access network node and the power-saving mode active time for the UE received by the first radio access network node can be different. In some implementations, the power-saving mode active time for the UE received by the third radio access network node can be shorter than the power-saving mode active time for the UE at the first radio access network node, and a difference between the starting of timing and the initiation of paging is subtracted.

It is not difficult to understand that, when the first radio access network node requests the third radio access network for a paging, the paging request contains the power-saving mode active time for the UE, so that the problem that the paging resources are wasted due to the initiation of a paging to the UE by the third radio access network within the UE unreached time since the third radio access network does not know the power-saving mode active time for the UE when initiating the paging to the UE can be effectively avoided.

Further, in some implementations, the enhanced DRX means that the UE has a longer sleep time. The first radio access network node can calculate the UE accessible time according to the enhanced DRX and/or the paging transmission time. Within the UE accessible time, a paging for the UE can be initiated. Or, beyond the UE accessible time, the first radio access network node can suspend a paging event, for example, buffer the data.

Optionally, the data buffer information can comprise at least one of the following: delay tolerance indication information, data buffer time, and the amount of data that can be buffered. In some implementations, when the UE is unreached temporarily, downlink data with a long delay can be buffered for a period of time by the network, and then transmitted to the UE when the connection of the UE to the network is resumed, for example, when the UE establishes or resumes the connection of the UE to the network in order to transmit a periodical location update request.

The delay tolerance indication information can indicate the radio access network node to buffer the data for the UE for a period of time when the UE is unreached. The buffer time can be the received data buffer time or the data buffer time configured on the first radio access network node. The delay tolerance indication can also be manifested as a long-delay data communication indication.

The data buffer time can be the maximum time for buffering the data. The first radio access network node can start timing the data buffer time upon receiving the data or when it is found that the UE is unreached.

Optionally, the data buffer information can be information about the level of bearers of the UE or the level of the UE. In other words, the data buffer information for all bearers of the UE can be identical, or the data buffer information for each bearer of the UE can be different.

Optionally, the light connection information for the UE can comprise at least one of the following: indication information about whether the UE can perform light connection, and indication information about whether the UE requests for light connection. The indication information about whether the UE can perform light connection can also be manifested as at least one of the following: whether the connection for the UE between the radio access network and the core network can be maintained after the UE connection between the UE and radio access network is disconnected or inactive, whether the UE context can be maintained in the radio access network after the UE connection between the UE and radio access network is disconnected or inactive, whether the radio access network performs radio access network paging trigger configuration on the UE after the UE connection between the UE and the network is disconnected or inactive, or more.

Optionally, the service information of the UE can comprise at least one of the following: enhanced Mobile Broadband (eMBB), massive Machine Type Communication (massive MTC), and mission-critical MTC.

Optionally, the paging valid time can be valid time for the paging associated with data for UE (also can be presented as paging valid duration). For example, the paging valid time associated with NAS data, or the paging valid time associated with data of session/QoS flow/bearer. In some implementations, the first radio access radio network node acquires paging valid time while acquiring data for UE. For example, when receiving NAS data packet, the first radio access network node acquires the paging valid time of the NAS data packet. In some other implementations, when receiving setup request for the session/QoS flow/bearer, the first radio access network node acquires the paging valid time of the session/QoS flow/bearer. The paging valid time can be the valid duration for the paging triggered by the radio access network. When the first radio access network node is disconnected with the UE, makes sure the UE is in light connection or the UE becomes inactive, upon reception the data for the UE, the first radio access network node performs radio access network paging for the UE according to the paging valid time of the received data. If the UE does not response to the paging within the paging valid time, then it may be not necessary to continue the paging for the UE, since the UE data associated with the paging valid time may have already become invalid.

Further, with reference to FIG. 3, the method for performing light connection control on a user equipment (UE) according to an embodiment of the present invention further comprises the following step.

Step 302: The first radio access network node performs corresponding light connection control on the UE according to the data information.

Wherein, the data information can comprise at least one of the following: power-saving mode information, data buffer information, light connection information, type information, service information, capability information and paging valid time. The specific contents of the power-saving mode information, the data buffer information, the light connection information, the type information, the service information, the capability information and paging valid time have been described in the step 301 and will not be repeated here.

Optionally, the step of performing light connection control on the UE can comprise at least one of the following: performing paging control, performing UE data buffer control, and configuring the UE to perform light connection control.

In some implementations, after the UE connection between the UE and the first radio access network node is disconnected or inactive, and if a paging event occurs (for example, downlink data for the UE is received), whether to initiate a paging for the UE can be decided according to the power-saving mode information for the UE.

Specifically, when the power-saving mode information indicates that the UE has entered the power-saving mode or has requested for the power-saving mode, the UE may not be paged; or, when the power-saving mode information of the UE indicates that the UE is within the corresponding power-saving mode active time, the first radio access network node can page the UE. Or otherwise, the first radio access network node can avoid paging the UE after the power-saving mode active time expires, because the UE is already unreached at this time.

In some implementations, after the UE connection between the UE and the first radio access network node is disconnected or inactive, and if a paging event occurs (for example, downlink data for the UE is received), whether to initiate a paging for the UE can be decided according to the paging valid time.

Specifically, the paging valid time (as described in step 301) indicates the time that the paging can reach the UE. During the paging valid time, the first radio access network node can perform paging for the UE; when exceeding the paging valid time, the first radio access network node can avoid paging the UE after exceeding the power-saving mode active time, since the UE is unreached at that time.

In some implementations, after the UE connection between the UE and network is disconnected or inactive, according to the power-saving mode active time for the UE, the first radio access network node can start to time for the active time. When the active time expires, the first radio access network node knows that the UE enters into the power-saving mode.

In some implementations, according to the power-saving mode indication information or power-saving mode active time, the first radio access network node knows that the UE enters into the power-saving mode after the UE connection between the UE and network is disconnected or inactive.

It is not difficult to understand that, the first radio access network node may not page the UE which has entered into the power-saving mode according to the power-saving mode information of the UE. In this way, the problem of wasting paging resources is avoided. Specifically, in an application scenario of this scheme, the UE requests the core network for the power-saving mode, and the core network node can allocate a power-saving mode active time to the UE after the confirmation. When the UE connection between the UE and network is disconnected or inactive, the UE can continuously monitor the network within the power-saving mode active time configured by the core network node. When the configured power-saving mode active time expires, the UE enters the power-saving mode. For a UE entering the power-saving mode, the UE will not monitor the network, including not monitoring the paging initiated by the first radio access network node to the UE. However, when the first radio access network node does not know whether the UE has requested for the power-saving mode, after the UE connection between the UE and the first radio access network is disconnected or inactive, and if the first radio access network configures the UE to be in the light connection state, that is, if the connection for the UE between the first radio access network and the core network is maintained, the first radio access network node cannot acquire, when paging a UE, a response from the UE entering the power-saving mode. The paging resources are wasted. However, through the power-saving mode information, the first radio access network node can know whether the UE has entered the power-saving mode or has requested for the power-saving mode. Thus, the waste of paging resources is avoided.

Further, in some implementations, after the UE connection between the UE and the first radio access network node is disconnected or inactive, and if the downlink data for the UE has arrived the first radio access network node, the first radio access network can perform UE data buffer control according to the data buffer information for the UE and/or the power-saving mode information for the UE. In some implementations, the data buffer control can comprise but be not limited to one of the following.

1. When the UE satisfies preconfigured unreached conditions, the first radio access network node buffers the UE data. Specifically, when the first radio access network node finds out that the UE is unreached, the first radio access network node can buffer the data for the UE for a period of time. Wherein, the buffer time can be the time configured on the first radio access network node, or can be the received data buffer time.

2. The first radio access network node can determine, according to different UE unreached reasons, whether to buffer the data. For a UE which is unreached because of entering the power-saving mode, the data is buffered for a period of time; while for a UE which is unreached for other reasons, the data may not be buffered or may be buffered for a shorter period of time.

Correspondingly, the preconfigured unreached conditions can comprise at least one of the following:

the first radio access network node fails to receive a response to the paging after initiating a paging to the UE;

the power-saving mode information indicates that the UE has entered the power-saving mode or has requested for the power-saving mode; and the power-saving mode information indicates that the UE is out of the corresponding power-saving mode active time.

It is not difficult to understand that the first radio access network node can perform UE data buffer control according to the acquired data buffer information and power-saving mode information of the UE. Specifically, in an application scenario of the present invention, some data transmitted to the UE can tolerate a long transmission delay, for example, updated software releases. When the UE is unreached temporarily (for example, entering the power-saving mode), the first radio access network node can buffer the data for a period of time; and, the first radio access network node can transmit the buffered data to the UE when the connection of the UE to the network is resumed (for example, the UE resumes the connection to the network to transmit the periodic location update). Thus, the problem of data loss due to the absence of data buffer is avoided.

In some implementations, the first radio access network node can decide, according to at least one of the following, whether to configure the UE to perform light connection control: light connection information for the UE, power-saving mode information for the UE, type information of the UE, service information of the UE, and capability information of the UE. In some implementations, whether to configure the UE to perform light connection control can comprise but be not limited to one of the following.

1. For a UE on which the power-saving mode is indicated, the first radio access network node may not configure the UE to perform light connection. The first radio access network node can know, according to the power-saving mode information for the UE, whether the UE is a UE on which the power-saving mode is indicated.

2. For a UE on which light connection can be performed or a UE that has requested for light connection, the first radio access network node can configure the UE to perform light connection. In some implementations, a UE that has requested for light connection will not request for the power-saving mode, while a UE that has requested for the power-saving mode will not request for light connection.

3. For a UE that cannot perform light connection or a UE that has not requested for light connection, the first radio access network node may not configure the UE to perform light connection.

4. When the type information and/or capability information of the UE indicates that the type of the UE belongs to a preconfigured light connection type, the first radio access network node configures light connection for the UE. Specifically, for some UE types, such as UEs which have a small amount of data, are not interacted with the network for a long time or have low requirements on the time delay, for example, a massive MTC, the first radio access network node may not configure the UEs to perform light connection. However, for other UEs which have a large amount of data, are frequently interacted with the network or have high requirements on the time delay (e.g., an eMBB or a critical MTC), the first radio access network node can configure the UEs to perform light connection. The first radio access network node can know, according to the type information of the UE and/or the capability information of the UE, whether the type of the UE is suitable for light connection, that is, whether the type of the UE belongs to a preconfigured light connection type.

5. When the service information of the UE indicates that the UE executes a preconfigured light connection service type, the first radio access network node configures light connection for the UE. For some service types which are not interacted with the network for a long time or have low requirements on the time delay, for example, a sensing and monitoring service for fire protection, for a UE that has executed this service type, the first radio access network node may not configure the UE to perform light connection. For other service types which are frequently interacted with the network or have high requirements on the time delay (for example, V2X, or an on-board collision monitoring service), for a UE that has executed this service type, the first radio access network node can configure the UE to perform light connection.

Further, in some implementations, the step of configuring light connection comprises at least one of the following steps of: after the UE connection between the UE and network is disconnected or inactive, maintaining, by the first radio access network node, the UE context;

after the UE connection between the UE and network is disconnected or inactive, maintaining, by the first radio access network node, the connection for the UE between the first radio access network node and the core network node; and( )

configuring, by the first radio access network node, an access network node anchor update region for the UE.

Correspondingly, in other implementations, the step of not configuring the UE to perform light connection comprises at least one of the following steps:

after the UE connection between the UE and network is disconnected or inactive, releasing, by the first radio access network node, the UE context;

after the UE connection between the UE and network is disconnected or inactive, releasing, by the first radio access network node, the connection for the UE between the first radio access network node and the core network node; and not configuring, by the first radio access network node, an access network node anchor update region for the UE.

In conclusion, in view of the problem that it is likely to result in signaling overhead far greater than the amount of data to be received/transmitted when UEs are connected to or disconnected from the network, as well as high delay while accessing to the network, which is easily caused by the trend of a large number of UEs to be accessed to the network and a small amount of data to be received/transmitted in the future, the present invention provides a method for performing light connection control on a UE. At least one of power-saving mode information, data buffer information, light connection information, type information, service information, capability information and paging valid time of the UE is acquired by a first radio access network node, and corresponding light connection control is performed on the UE according to the acquired information. In other words, with the solutions, light connection control on the UE can be distinguishingly realized according to the acquired different information corresponding to the UE, so that the signaling overhead is saved, the time delay for the UE to access to the network is reduced, and the advantages of the light connection function are realized.

Correspondingly, the present invention further provides a method for performing light connection control on a UE. That is, the method is described from the perspective of a core network node. By programming, the method for performing light connection control on a UE can be implemented as a computer program to be performed on a remote core network equipment. The remote core network equipment comprises but is not limited to: a computer, a network host, a single network server, a multiple of sets of network servers or, cloud consisting of a multiple of servers.

Specifically, FIG. 4 is a flowchart of a method for performing light connection control on a UE according to an embodiment of the present invention, specifically comprising the following steps.

Step 401: A core network node acquires at least one type of data information corresponding to a UE, wherein the data information comprises: power-saving mode information, data buffer information, light connection information, type information, service information, capability information and paging valid time.

In some implementations, the core network control node receives the above information from a radio access network node, the UE, another core network control node or a core network user plane node. Optionally, the power-saving mode information of the UE comprises at least one of the following: power-saving mode indication information for the UE, power-saving mode active time for the UE, enhanced Discontinuous Reception (DRX), and a paging transmission window.

Optionally, the information contained in the power-saving mode information for the UE has been described in the step 301 and will not be repeated here.

Optionally, the information contained in the data buffer information for the UE has been described in the step 301 and will not be repeated here.

Optionally, the information contained in the light connection information for the UE has been described in the step 301 and will not be repeated here.

Optionally, the information contained in the type information of the UE has been described in the step 301 and will not be repeated here.

Optionally, the information contained in the service information of the UE has been described in the step 301 and will not be repeated here.

Optionally, the information contained in the capability information of the UE has been described in the step 301 and will not be repeated here.

Further, with reference to FIG. 4, the method for performing light connection control on the UE according to an embodiment of the present invention further comprises the following step.

Step 402: The core network node performs corresponding light connection control on the UE according to the data information, wherein the data information can comprise at least one of the following: power-saving mode information, data buffer information, light connection information, type information, service information, capability information and paging valid time.

It is not difficult to understand that, the method provided by the present invention can further comprise the step of: performing, by the core network node, corresponding power-saving mode control on the UE according to the data information.

Optionally, the step of performing, by the core network node, light connection control on the UE can comprise at least one of the following: deciding whether light connection can be performed on the UE. In some implementations, whether light connection can be performed on the UE can be manifested as whether the UE is suitable for performing light connection.

Optionally, the step of performing, by the core network node, light connection control on the UE can comprise at least one of the following: deciding whether the power-saving mode can be performed on the UE.

In some implementations, the conditions for the core network node to decide that light connection can be performed on the UE can comprise but be not limited to at least one of the following.

1. When the light connection information indicates that the UE has requested for light connection or has satisfied the conditions for the light connection, the core network node can determine that light connection can be performed on the UE. Specifically, the core network node can know, according to the light connection information for the UE, whether the UE has requested for light connection.

2. When the type information and/or capability information indicates that the type of the UE belongs to a preconfigured light connection type, the core network node can determine that light connection can be performed on the UE.

Specifically, the UE type suitable for light connection can comprise a UE having a large amount of data, for example, the amount of data contained in the UE exceeds a certain preconfigured value; a UE which is frequently interacted with the network or a UE which has high requirements on the time delay, for example, an eMBB or a critical MTC, i.e., a UE which is interacted with the network within a preconfigured time or has a required delay value less than a preconfigured delay value. The core network node can know, according to the type information of the UE or the capability information of the UE, whether the type of the UE is suitable for light connection.

3. When the service information indicates that a preconfigured light connection service type has been performed on the UE, the core network node can determine that light connection can be performed on the UE. Specifically, the preconfigured light connection service type comprises a service type in which the UE is interacted with the network within a preconfigured time; and/or, a service type in which the required delay value of the UE is less than a preconfigured delay value of the service type. The service type suitable for light connection can be a service which is frequently interacted with the network or has high requirements on the time delay, for example, V2X or an on-board collision monitoring service.

In other implementations, the conditions for the core network node to decide that light connection cannot be performed on the UE can comprise but be not limited to at least one of the following.

1. When the power-saving mode information indicates that the UE has indicated the power-saving mode, the core network node can determine that light connection cannot be performed on the UE. The core network node can know, according to the power-saving mode information for the UE, that the UE is a UE on which the power-saving mode is indicated.

2. When the type information and/or capability information indicates that the type of the UE does not belong to a preconfigured light connection type, the core network node can determine that light connection cannot be performed on the UE. Specifically, the type of the UE not belonging to the preconfigured light connection type can comprise: the amount of data for the UE is less than a certain preconfigured value; and, the UE is not interacted with the network within a preconfigured time or the required delay value of the UE is higher than a preconfigured delay value, for example, a massive MTC.

3. When the service information indicates that the UE has executed a preconfigured service type which does not perform light connection, the core network node can determine that light connection cannot be performed on the UE. The service type not suitable for light connection can comprise a service type which is not interacted with the network for a long time or has low requirements on time delay, i.e., a service type which is not interacted with the network within a preconfigured time or a service type in which the required delay value of the UE is higher than a preconfigured delay value, for example, a UE which performs a fire protection sensing and monitoring service.

In some implementations, the conditions for the core network node to decide that the power-saving mode can be performed on the UE can be the conditions for the core network node to decide that light connection cannot be performed on the UE, and will not be repeated here.

In some implementations, the conditions for the core network node to decide that the power-saving mode cannot be performed on the UE can be the conditions for the core network node to decide that light connection can be performed on the UE, and will not be repeated here.

Further, with reference to FIG. 4, the method for performing light connection control on a UE according to an embodiment of the present invention further comprises the following step.

Step 403: The core network node transmits, to a remote terminal, light connection information corresponding to the light connection control.

Correspondingly, it is not difficult to understand that, after the step of performing, by the core network node, corresponding power-saving mode control on the UE according to the data information, the method provided by the present invention can further comprise the step of: transmitting, by the core network node and to a remote terminal, power-saving mode information corresponding to the power-saving mode control.

In some implementations, the remote terminal can comprise a UE and/or a first radio access network node.

In some implementations, the core network node can transmit the light connection information for the UE to the UE or the first radio access network node, and the light connection information for the UE indicates information, which is decided by the core network node, on whether light connection can be performed on the UE.

In some implementations, when the core network decides that the power-saving mode can be performed on the UE, the power-saving mode information for the UE can be transmitted to the UE or the first radio access network node.

In conclusion, in view of the problem that it is likely to result in signaling overhead far greater than the amount of data to be received/transmitted when UEs are connected to or disconnected from the network, as well as high delay while accessing to the network, which is easily caused by the trend of a large number of UEs to be accessed to the network and a small amount of data to be received/transmitted in the future, the present invention provides a method for performing light connection control on a UE. At least one of power-saving mode information, data buffer information, light connection information, type information, service information, capability information and paging valid time of the UE is acquired by a core network node; and, the core network node performs corresponding light connection control on the UE according to the acquired information, and transmits, to a remote terminal, light connection information corresponding to the light connection control. In other words, with the solutions, the core network node can distinguishingly perform light connection control on the UE according to the acquired different information corresponding to the UE, so that the signaling overhead is saved, the time delay for the UE to access to the network is reduced, and the advantages of the light connection function are realized.

To conveniently understand the specific implementations of the solutions of the present invention, the solutions of the present invention will be described below in detail by specific embodiments.

Embodiment 1

FIG. 5 shows a flowchart of a method for performing light connection control on a UE according to Embodiment 1 of the present invention. Specifically, this embodiment is applied in a procedure of establishing or resuming the connection of the UE to the network. This embodiment embodies, on one hand, implementations of performing paging control, data buffer control and light connection control by a radio access network node, and on the other hand, implementations of performing light connection control by a core network node. As shown in FIG. 5, the method comprises the following steps.

Step 501: A Radio Resource Control (RRC) connection between a UE and a first radio access network node is established or resumed.

Optionally, an RRC connection setup request message or an RRC connection resume request message can contain data information corresponding to the UE, wherein the data information can comprise at least one of the following: power-saving mode information, data buffer information, light connection information, type information, service information, capability information and paging valid time. Upon receiving the above data information, the first radio access network node can perform paging control, perform UE data buffer control, and configure the UE to perform light connection control, as described in the step 302.

Step 502: The first radio access network node transmits an initial UE message to a core network control node. The initial UE message can contain an attach request or Tracking Area Update (TAU) request of the UE.

Optionally, the UE can transmit, to the core network node, data information corresponding to the UE by the attach request or TAU request from the UE, wherein the data information can comprise at least one of the following: power-saving mode information, data buffer information, light connection information, type information, service information, capability information and paging valid time, as described in the step 401.

The core network performs control according to the related information, specifically as described in the step 402.

Step 503: The core network control node transmits an initial context setup request message to the first radio access network node.

Optionally, when the core network control node decides that the power-saving mode can be performed on the UE, the core network control node can transmit the power-saving mode information for the UE to the first radio access network node by the initial context setup request message, as described in the step 403.

Optionally, the core network control node can transmit the light connection information for the UE to the radio access network node by the initial context setup request message, where the light connection information for the UE indicates information, which is decided by the core network node, on whether light connection can be performed on the UE, as described in the step 403.

Optionally, the initial context setup request message can contain data information corresponding to the UE, wherein the data information can comprise at least one of the following: power-saving mode information, data buffer information, light connection information, type information, service information, capability information and paging valid time. Upon receiving the above information, the first radio access network node can perform paging control, perform UE data buffer control, and configure the UE to perform light connection control, as described in the step 302.

Step 504: The first radio access network node transmits an initial context setup response message to the core network control node.

Step 505: The first radio access network node performs RRC connection reconfiguration on the UE.

An RRC reconfiguration request message can contain an attach acceptation or TAU acceptation message.

Optionally, when the core network control node decides that the power-saving mode can be performed on the UE, the core network control node can transmit the power-saving mode information for the UE to the UE by the attach acceptation or TAU acceptation message, as described in the step 403.

Optionally, the core network control node can transmit the light connection information for the UE to the UE by the attach acceptation or TAU acceptation message, as described in the step 403.

Step 506: The first radio access network node transmits an initial context setup completion message to the core network control node.

Now, the method flow in this embodiment ends.

Embodiment 2

FIG. 6 shows a flowchart of a method for performing light connection control on a UE according to Embodiment 2 of the present invention. Specifically, Embodiment 2 is applied in a procedure of triggering a Tracking Area (TA) update by a UE when the UE is connected to the network. This embodiment embodies, on one hand, implementations of performing paging control, data buffer control and light connection control by a radio access network node, and on the other hand, implementations of performing light connection control by a core network node. As shown in FIG. 6, the method comprises the following steps.

Step 601: A UE transmits an uplink information transport message to a first radio access network node.

Optionally, the uplink information transport message can contain data information corresponding to the UE, wherein the data information can comprise at least one of the following: power-saving mode information, data buffer information, light connection information, type information, service information, capability information and paging valid time. Upon receiving the above information, the first radio access network node can perform paging control, perform data buffer control, and configure the UE to perform light connection control, as described in the step 302.

Step 602: The first radio access network node transmits an uplink NAS transport message to a core network control node.

The uplink NAS transport message can contain a TAU request of the UE.

Optionally, the UE can transmit, to the core network node, data information corresponding to the UE by the TAU request of the UE, wherein the data information can comprise at least one of the following: power-saving mode information, data buffer information, light connection information, type information, service information, capability information and paging valid time.

The specific information contents are described in the step 401. The core network performs control according to the related information, specifically as described in the step 402.

Step 603: The core network control node transmits a downlink NAS transport message to the first radio access network node.

Optionally, when the core network control node decides that the power-saving mode can be performed on the UE, the core network control node can transmit the power-saving mode information for the UE to the first radio access network node by the downlink NAS transport message, as described in the step 403.

Optionally, the core network control node can transmit the light connection information for the UE to the radio access network node by the downlink NAS transport message, where the light connection information for the UE indicates information, which is decided by the core network node, on whether light connection can be performed on the UE, as described in the step 403.

Optionally, the downlink NAS transport message can contain data information corresponding to the UE, wherein the data information can comprise at least one of the following: power-saving mode information, data buffer information, light connection information, type information, service information, capability information and paging valid time. Upon receiving the above information, the first radio access network node can perform paging control, perform UE data buffer control, and configure the UE to perform light connection control, as described in the step 302.

Step 604: The first radio access network node transmits a downlink information transport message to the UE.

Wherein, the downlink information transport message can contain a TAU acceptation message.

Optionally, when the core network control node decides that the power-saving mode can be performed on the UE, the core network control node can transmit the power-saving mode information for the UE to the UE by the TAU acceptation message, as described in the step 403.

Optionally, the core network control node can transmit the light connection information for the UE to the UE by the TAU acceptation message, as described in the step 403.

Now, the method flow in this embodiment ends.

Embodiment 3

FIG. 7 shows a flowchart of a method for performing light connection control on a UE according to Embodiment 3 of the present invention. Specifically, Embodiment 3 is applied in a procedure of establishing a UE bearer. This embodiment embodies, on one hand, implementations of performing paging control, data buffer control and light connection control by a radio access network node, and on the other hand, implementations of performing light connection control by a core network node. As shown in FIG. 7, the method comprises the following steps.

Step 701: A core network control node transmits an Evolved Radio Access Bearer (E-RAB) setup request or modification request message to a first radio access network node.

Optionally, when the core network control node decides that the power-saving mode can be performed on a UE, the core network control node can transmit the power-saving mode information for the UE to the first radio access network node by the E-RAB setup request or modification request message, as described in the step 403.

Optionally, the core network control node can transmit the light connection information for the UE to the radio access network node by the E-RAB setup request or modification request message, where the light connection information for the UE indicates information, which is decided by the core network node, on whether light connection can be performed on the UE, as described in the step 403.

Optionally, the E-RAB setup request or modification request message can contain data information corresponding to the UE, wherein the data information can comprise at least one of the following: power-saving mode information, data buffer information, light connection information, type information, service information, capability information and paging valid time. Upon receiving the above information, the first radio access network node can perform paging control, perform UE data buffer control, and determine whether to configure the UE to perform light connection control, as described in the step 302.

Step 702: The first radio access network node performs RRC connection reconfiguration on the UE.

Step 703: The first radio access network node transmits an E-RAB setup response or modification request response message to the core network control node.

Now, the method flow in this embodiment ends.

Embodiment 4

FIG. 8 shows a flowchart of a method for performing light connection control on a UE according to Embodiment 4 of the present invention. Specifically, Embodiment 4 is applied after the UE connection between the UE and network is disconnected or inactive. This embodiment embodies implementations of performing paging control, data buffer control and light connection control by a radio access network node. As shown in FIG. 8, the method comprises the following steps.

Step 801: An RRC connection between a UE and a first radio access network node is released or suspended. Optionally, after the RRC connection is released or suspended, the first radio access network node can start timing the power-saving mode active time for the UE. The power-saving mode active time for the UE is described in the step 301 and will not be repeated here.

Step 802: The first radio access network node receives downlink data for the UE.

If the power-saving mode active time for the UE does not expire, the first radio access node pages the UE. Optionally, the first radio access network can also transmit a paging for the UE to a second radio access network node, as described in following step 803.

In some implementations, when the UE is unreached and the power-saving mode active time for the UE expires, the first radio access network node stops paging the UE.

Step 803: The first radio access network node transmits, to a second radio access network node, a paging message for the UE.

Optionally, the paging message can contain data information corresponding to the UE, wherein the data information can comprise at least one of the following: power-saving mode information, data buffer information, light connection information, type information, service information, capability information and paging valid time. Upon receiving the above information, the second radio access network node can perform paging control on the UE, as described in the step 302.

In some implementations, when the UE is unreached, the UE data is the delay-tolerable data, and the first radio access network node is allowed to buffer the UE data according to the data buffer time configured on the first radio access network by itself or according to the received data buffer time, as described in the step 302.

Optionally, timing the power-saving mode active time for the UE is started. The power-saving mode active time for the UE is described in the step 301 and will not be repeated here.

Optionally, when the UE is unreached, there are two ways to stop the paging for the UE at the second radio access network node. In the first way, after the power-saving mode active time for the UE expires, the first radio access network node transmits a paging stop message to the second radio access network node, as described in step 804. In the second way, after the second radio access network node knows that the UE is a UE entering the power-saving mode, upon receiving the paging message, the second radio access network node can start timing the power-saving mode active time for the UE. The power-saving mode active time for the UE at the second radio access network node can be configured by default or received from the first radio access network node. The power-saving mode active time for the UE received by the second radio access network node can be shorter than the power-saving mode active time for the UE at the first radio access network node, and a difference between the starting of timing and the initiation of paging is subtracted.

Step 804: Optionally, the first radio access network node transmits a paging stop message to the second radio access network node, so as to request to stop the paging for the UE. In some implementations, when the UE is unreached and after the power-saving mode active time for the UE expires, the first radio access network node transmits a paging stop message to the second radio access network node.

Now, the method flow in this embodiment ends.

In conclusion, Embodiment 1 is applied in a procedure of establishing and resuming the connection of the UE to the network, and can embody, on one hand, implementations of performing paging control, data buffer control and light connection control by a radio access network node, and on the other hand, implementations of performing light connection control by a core network node; Embodiment 2 is applied in a procedure of triggering a TA update by the UE when the UE is connected to the network, and embodies, on one hand, implementations of performing paging control, data buffer control and light connection control by a radio access network node, and on the other hand, implementations of performing light connection control by a core network node; Embodiment 3 is applied in a procedure of establishing a UE bearer, and embodies, on one hand, implementations of performing paging control, data buffer control and light connection control by a radio access network node, and on the other hand, implementations of performing light connection control by a core network node; and, Embodiment 4 is applied after the UE is discontented, and embodies implementations of performing paging control, data buffer control and light connection control by a radio access network node.

It can be seen from the technical solutions that, in the present invention, by synchronizing the light connection information, power-saving mode information, data buffer information or more for the UE by a radio access network node and a core network node, the paging control, data buffer control and light connection control on the UE can be realized. By distinguishing different UE types and service types to realize the light connection, the light connection can be configured for a UE which is really suitable for light connection, so that the signaling overhead is saved, the time delay for the UE to access to the network is reduced and the advantages of the light connection function are realized.

Further, in accordance with the function modularization concept of the computer software and based on the method for performing light connection control on a UE, the present invention further provides an equipment for performing light connection control on a UE, which can be a radio access network equipment. Specifically, referring to FIG. 9, the equipment comprises a radio access network acquisition module 901 and a radio access network control module 902.

Specifically, the radio access network acquisition module 901 is configured to acquire, by a first radio access network node, at least one type of data information corresponding to a UE; and, the radio access network control module 902 is configured to perform, by the first radio access network node, corresponding light connection control on the UE according to the data information, wherein the data information comprises: power-saving mode information, data buffer information, light connection information, type information, service information, capability information and paging valid time.

In the solutions of the present invention, the specific function implementations of the modules in the equipment for performing light control on a UE can refer to the specific steps 301 and 302, and will not be repeated here.

Similarly, in accordance with the function modularization concept of the computer software and based on the method for performing light connection control on a UE as described above, the present invention further provides an equipment for performing light connection control on a UE, which can be a core network equipment. Specifically, referring to FIG. 10, the equipment comprises a core network acquisition module 1001, a core network control module 1002 and an information transmission module 1003.

Specifically, the core network acquisition module 1001 is configured to acquire, by a core network node, at least one type of data information corresponding to a UE; the core network control module 1002 is configured to perform, by the core network node, corresponding light connection control on the UE according to the data information; and, the information transmission module 1003 is configured to transmit, by the core network node and to a remote terminal, light connection information corresponding to the light connection control, wherein the data information comprises: power-saving mode information, data buffer information, light connection information, type information, service information, capability information and paging valid time.

In the solutions of the present invention, the specific function implementations of the modules in the equipment for performing light control on a UE can refer to the specific steps 401, 402 and 403, and will not be repeated here.

The foregoing descriptions are merely some implementations of the present invention. It should be noted that, to a person of ordinary skill in the art, various improvements and modifications can be made without departing from the principle of the present invention, and these improvements and modifications shall be regarded as falling into the protection scope of the present invention.

The invention claimed is:

1. A method performed by a base station for controlling a state of a terminal in a wireless communication system, the method comprising:
   receiving, from an access and mobility management function (AMF), information for controlling the state of the terminal including an indication associated with a mobile initiated connection only (MICO) mode;
   determining whether to configure the state of the terminal to a radio resource control (RRC) inactive state, based on the information;
   maintaining a context of the terminal in the base station, in case that the terminal is configured to the RRC inactive state; and
   performing a paging for the terminal based on mobile terminated (MT) data being received,
   wherein the paging is not performed based on the indication indicating that the terminal is allowed the MICO mode, in a case that the terminal enters an idle state, and
   wherein entering the MICO mode of the terminal is determined based on an active time being expired after the terminal enters the idle state, the active time being allocated by the AMF.

2. The method of claim 1, wherein the MICO mode for the terminal is determined by the AMF based on a request from the terminal to the AMF.

3. The method of claim 1, further comprising:
receiving, from the terminal, a request for the MICO mode,
wherein the MICO mode is determined to be allowed for the terminal based on the request.

4. The method of claim 1, wherein the information is transmitted by an initial context setup message.

5. The method of claim 4, wherein the initial context setup message further includes information on a value of a discontinuous reception (DRX) for the terminal.

6. A method performed by an access and mobility management function (AMF) for controlling a state of a terminal in a wireless communication system, the method comprising:
allowing a mobile initiated connection only (MICO) mode for the terminal;
transmitting, to a base station, information for controlling the state of the terminal including an indication indicating that the terminal is allowed the MICO mode; and
maintaining a connection between the base station and the AMF, in case that the terminal is configured to a radio resource control (RRC) inactive state based on the information,
wherein a context of the terminal is maintained in the base station based on the RRC inactive state,
wherein a paging message for the terminal based on mobile terminated (MT) data is not transmitted from the AMF to the base station, in case that the terminal enters an idle state, and
wherein entering the MICO mode of the terminal is determined based on an active time being expired after the terminal enters the idle state, the active time being allocated by the AMF.

7. The method of claim 6, wherein the information is transmitted by an initial context setup message.

8. The method of claim 7, wherein the initial context setup message further includes information on a value of a discontinuous reception (DRX) for the terminal.

9. A base station for controlling a state of a terminal in a wireless communication system, comprising:
a transceiver; and
a controller configured to:
control the transceiver to receive, from an access and mobility management function (AMF), information for controlling the state of the terminal including an indication associated with a mobile initiated connection only (MICO) mode,
determine whether to configure the state of the terminal to a radio resource control (RRC) inactive state based on the information,
maintain a context of the terminal in the base station, in case that the terminal is configured to the RRC inactive state; and
perform a paging for the terminal based on mobile terminated (MT) data being received,
wherein the paging is not performed based on the indication indicating that the terminal is allowed the MICO mode, in case that the terminal enters an idle state, and
wherein entering the MICO mode of the terminal is determined based on an active time being expired after the terminal enters the idle state, the active time being allocated by the AMF.

10. The base station of claim 9, wherein the information is transmitted by an initial context setup message.

11. The base station of claim 10, wherein the initial context setup message further includes information on a value of a discontinuous reception (DRX) for the terminal.

12. The base station of claim 9, wherein the MICO mode for the terminal is determined by the AMF based on a request from the terminal to the AMF.

13. An access and mobility management function (AMF) for controlling a state of a terminal in a wireless communication system, the AMF comprising:
a transceiver; and
a controller configured to:
allow a mobile initiated connection only (MICO) mode for the terminal, and control the transceiver to transmit, to a base station, information for controlling the state of the terminal including an indication indicating that the terminal is allowed the MICO mode, and
maintain a connection between the base station and the AMF, in case that the terminal is configured to a radio resource control (RRC) inactive state based on the information,
wherein a context of the terminal is maintained in the base station based on the RRC inactive state, and
wherein a paging message for the terminal based on mobile terminated (MT) data is not transmitted from the AMF to the base station, in case that the terminal enters an idle state, and
wherein entering the MICO mode of the terminal is determined based on an active time being expired after the terminal enters the idle state, the active time being allocated by the AMF.

14. The AMF of claim 13, wherein the controller is further configured to control the transceiver to receive, from the terminal, a request for the MICO mode, and determine to allow the MICO mode for the terminal based on the request.

15. The AMF of claim 13, wherein the information is transmitted by an initial context setup message.

16. The AMF of claim 15, wherein the initial context setup message further includes information on a value of a discontinuous reception (DRX) for the terminal.

* * * * *